United States Patent
Lan et al.

(10) Patent No.: US 10,567,272 B2
(45) Date of Patent: Feb. 18, 2020

(54) BIT ERROR INFORMATION TRANSFER METHOD, NETWORK DEVICE, AND COMMUNICATIONS SYSTEM

(71) Applicant: Huawei Technologies Co., Ltd., Shenzhen (CN)

(72) Inventors: Ruqin Lan, Beijing (CN); Wenxia Hou, Beijing (CN); Zhibo Hu, Beijing (CN); Xudong Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 107 days.

(21) Appl. No.: 15/635,649

(22) Filed: Jun. 28, 2017

(65) Prior Publication Data
US 2017/0302567 A1    Oct. 19, 2017

Related U.S. Application Data

(63) Continuation of application No. PCT/CN2014/095264, filed on Dec. 29, 2014.

(51) Int. Cl.
| | |
|---|---|
| *H04L 12/707* | (2013.01) |
| *G06F 11/07* | (2006.01) |
| *H04L 12/761* | (2013.01) |
| *H04L 29/06* | (2006.01) |
| *H04L 29/08* | (2006.01) |

(52) U.S. Cl.
CPC ............ *H04L 45/22* (2013.01); *G06F 11/076* (2013.01); *G06F 11/0709* (2013.01);
(Continued)

(58) Field of Classification Search
CPC ..... H04L 12/707; H04L 12/761; H04L 29/06; H04L 69/22; H04L 45/22; H04L 45/16;
(Continued)

(56) References Cited

U.S. PATENT DOCUMENTS

| | | | |
|---|---|---|---|
| 2007/0162825 A1* | 7/2007 | Wang | G06F 13/4286 714/763 |
| 2007/0165515 A1* | 7/2007 | Vasseur | H04L 12/66 370/216 |

(Continued)

FOREIGN PATENT DOCUMENTS

| | | |
|---|---|---|
| CN | 1567904 A | 1/2005 |
| CN | 101217402 A | 7/2008 |

(Continued)

OTHER PUBLICATIONS

Machine Translation and Abstract of Chinese Publication No. CN101588220, Nov. 25, 2009, 9 pages.

(Continued)

*Primary Examiner* — Kyaw Z Soe
(74) *Attorney, Agent, or Firm* — Conley Rose, P.C.

(57) ABSTRACT

A bit error information transfer method, a network device, and a communications system are provided, so as to resolve a problem that an existing BFD mechanism cannot be applied to a layer 2 network and cannot be widely applied. In some feasible implementation manners of the application, the method includes: detecting, by a second network device, whether a bit error occurs on a first unidirectional link from a first network device to the second network device; when detecting that a bit error occurs on the first unidirectional link, generating an ISIS packet including bit error information, where the bit error information is used to indicate that the bit error occurs on the first unidirectional link; and sending the ISIS packet to the first network device.

20 Claims, 7 Drawing Sheets

(52) U.S. Cl.
CPC ...... *G06F 11/0772* (2013.01); *G06F 11/0793* (2013.01); *H04L 45/16* (2013.01); *H04L 69/22* (2013.01); *H04L 69/324* (2013.01)

(58) Field of Classification Search
CPC .................. H04L 1/1607; H04L 29/08; H04L 2001/0097; H04L 69/324; G06F 11/07; G06F 11/0709; G06F 11/0772; G06F 11/076; G06F 11/0793
See application file for complete search history.

(56) References Cited

U.S. PATENT DOCUMENTS

| | | | | |
|---|---|---|---|---|
| 2012/0092986 | A1* | 4/2012 | Chen ...................... | H04L 45/22 370/228 |
| 2016/0119089 | A1* | 4/2016 | Zhang ...................... | H04L 1/00 370/328 |

FOREIGN PATENT DOCUMENTS

| | | |
|---|---|---|
| CN | 101588220 A | 11/2009 |
| CN | 103825832 A | 5/2014 |
| CN | 103973414 A | 8/2014 |

OTHER PUBLICATIONS

Machine Translation and Abstract of Chinese Publication No. CN103825832, May 28, 2014, 8 pages.
Machine Translation and Abstract of Chinese Publication No. CN103973414, Aug. 6, 2014, 22 pages.
Foreign Communication From a Counterpart Application, PCT Application No. PCT/CN2014/095264, English Translation of International Search Report dated Oct. 10, 2015, 2 pages.
Foreign Communication From a Counterpart Application, PCT Application No. PCT/CN2014/095264, English Translation of Written Opinion dated Oct. 10, 2015, 6 pages.
Foreign Communication From a Counterpart Application, European Application No. 14909295.9, Extended European Search Report dated Nov. 22, 2017, 6 pages.
Machine Translation and Abstract of Chinese Publication No. CN1567904, Jan. 19, 2005, 12 pages.
Machine Translation and Abstract of Chinese Publication No. CN101217402, Jul. 9, 2008, 18 pages.
Foreign Communication From a Counterpart Application, Chinese Application No. 201480077869.4, Chinese Office Action dated Jan. 2, 2019, 7 pages.

* cited by examiner

BIT ERROR INFORMATION TRANSFER METHOD, NETWORK DEVICE, AND COMMUNICATIONS SYSTEM

CROSS-REFERENCE TO RELATED APPLICATIONS

This application is a continuation of International Application No. PCT/CN2014/095264, filed on Dec. 29, 2014, the disclosure of which is hereby incorporated by reference in its entirety.

TECHNICAL FIELD

The application relates to the field of communications technologies, and in particular, to a bit error information transfer method, a network device, and a communications system.

BACKGROUND

A bit error often occurs in a signal transmission process. The bit error occurs because decay changes a voltage of a signal in the signal transmission process, causing the signal to be damaged during transmission. The bit error is caused by noise, a pulse caused by an alternating current or a lightning strike, a transmission device fault, or another factor. For example, a transmitted signal is 1, but a received signal is 0; or a transmitted signal is 0, but a received signal is 1. A traffic loss may be caused when the bit error occurs.

In the prior art, a bidirectional forwarding detection (BFD) mechanism is usually used to transfer a bit error. The BFD is a fast and independent "hello" protocol, and can achieve millisecond-level link fault detection. In the BFD, after a session is established between neighboring systems, a BFD packet is periodically sent on a channel between the neighboring systems. If a system fails to receive a BFD packet within an agreed detection time period, it is considered that a part of the bidirectional channel encounters a fault. When a bit error occurs in a direction of a link, the bit error may be carried in a protocol packet sent using the BFD, to notify a peer end of the bit error, so that the peer end device also perceives the bit error. In an upper-layer protocol, a cost value of a link is adjusted by perceiving a bit error, so as to trigger traffic adjustment.

It is found through practice that the BFD is based on a layer 3 User Datagram Protocol (UDP) protocol, depends on an internet protocol (IP) address, and cannot be applied to a layer 2 network. Therefore, currently, there is an urgent need to provide a solution for transferring a bit error in the layer 2 network.

SUMMARY

Embodiments of the application provide a bit error information transfer method, a network device, and a communications system, so as to resolve a problem that an existing BFD mechanism cannot be applied to a layer 2 network and cannot be widely applied.

A first aspect of the application provides a bit error information transfer method, including: detecting, by a second network device, whether a bit error occurs on a first unidirectional link from a first network device to the second network device; when detecting that a bit error occurs on the first unidirectional link, generating an Intermediate System to Intermediate System (ISIS) packet including bit error information, where the bit error information is used to indicate that the bit error occurs on the first unidirectional link; and sending the ISIS packet to the first network device.

With reference to the first aspect, in a first possible implementation manner, the generating an ISIS packet including bit error information includes generating an ISIS hello packet including the bit error information, where the bit error information is carried in a type-length-value (TLV) field of the ISIS hello packet, and the bit error information includes a bit error level used to indicate a bit error severity level, and a bit error flag used to indicate a bit error type; and the sending the ISIS packet to the first network device includes sending the ISIS hello packet to the first network device using a second unidirectional link from the second network device to the first network device, where the first unidirectional link and the second unidirectional link belong to a same physical link.

With reference to the first aspect, in a second possible implementation manner, the generating an ISIS packet including bit error information includes generating an ISIS link state packet (LSP) packet including the bit error information, where the ISIS LSP packet includes a first TLV field and a second TLV field, and the bit error information includes a bit error level that is carried in the first TLV field and that is used to indicate a bit error severity level, a bit error flag that is carried in the first TLV field and that is used to indicate a bit error type, and a link identifier that is carried in the second TLV field and that is used to indicate the link on which a bit error occurs; and the sending the ISIS packet to the first network device includes sending the ISIS LSP packet to all neighboring devices, and transferring the ISIS LSP packet to the first network device using all the neighboring devices.

A second aspect of the application provides a bit error information transfer method, including receiving, by a first network device, an ISIS packet that is sent by a second network device and that includes bit error information, where the bit error information is used to indicate that a bit error occurs on a first unidirectional link from the first network device to the second network device; and performing traffic adjustment according to the bit error information, so as to subsequently send data to the second network device using another link other than the first unidirectional link.

With reference to the second aspect, in a first possible implementation manner, the performing traffic adjustment according to the bit error information includes increasing a cost value of the first unidirectional link, so that the cost value of the first unidirectional link is at least greater than a cost value of a third unidirectional link, where the third unidirectional link is the another link from the first network device to the second network device; or disconnecting the first unidirectional link.

With reference to the first possible implementation manner of the second aspect, in a second possible implementation manner, the receiving, by a first network device, an ISIS packet that is sent by a second network device and that includes bit error information includes receiving, by the first network device, an ISIS hello packet that is sent by the second network device and that includes the bit error information, where the bit error information is carried in a TLV field of the ISIS hello packet, and the bit error information includes a bit error level used to indicate a bit error severity level, and a bit error flag used to indicate a bit error type; and the performing traffic adjustment according to the TLV field includes determining, according to the bit error flag, to increase the cost value of the first unidirectional link or disconnect the first unidirectional link; and when determining to increase the cost value of the first unidirectional link, determining, according to the bit error level, an extent to which the cost value of the first unidirectional link is to be increased.

With reference to the first possible implementation manner of the second aspect, in a third possible implementation manner, the receiving, by a first network device, an ISIS packet that is sent by a second network device and that includes a TLV field includes receiving, by the first network device, an ISIS LSP packet that is sent by the second network device and that includes the bit error information, where the ISIS LSP packet includes a first TLV field and a second TLV field, and the bit error information includes a bit error level that is carried in the first TLV field and that is used to indicate a bit error severity level, a bit error flag that is carried in the first TLV field and that is used to indicate a bit error type, and a link identifier that is carried in the second TLV field and that is used to indicate the link on which a bit error occurs; and the performing traffic adjustment according to the TLV field includes determining, according to the bit error flag, to increase the cost value of the first unidirectional link or disconnect the first unidirectional link; and when determining to increase the cost value of the first unidirectional link, determining, according to the bit error level, an extent to which the cost value of the first unidirectional link is to be increased.

With reference to the second aspect or the first possible implementation manner of the second aspect, in a fourth possible implementation manner, the receiving, by a first network device, an ISIS packet that is sent by a second network device and that includes bit error information includes receiving, by the first network device, an ISIS hello packet that is sent by the second network device and that includes the bit error information, and an ISIS LSP packet that is sent by the second network device and that includes the bit error information; and the performing traffic adjustment according to the bit error information includes performing traffic adjustment according to the bit error information included in the ISIS LSP packet or according to the bit error information included in the ISIS hello packet.

A third aspect of the application provides a network device, including a bit error detection module configured to detect whether a bit error occurs on a first unidirectional link from another network device to the network device; a packet generation module configured to, when it is detected that a bit error occurs on the first unidirectional link, generate an ISIS packet including bit error information, where the bit error information is used to indicate that the bit error occurs on the first unidirectional link; and a sending module configured to send the ISIS packet to the another network device.

With reference to the third aspect, in a first possible implementation manner, the packet generation module is configured to generate an ISIS hello packet including the bit error information, where the bit error information is carried in a TLV field of the ISIS hello packet, and the bit error information includes a bit error level used to indicate a bit error severity level, and a bit error flag used to indicate a bit error type; and the sending module is configured to send the ISIS hello packet to the another network device using a second unidirectional link from the network device to the another network device, where the first unidirectional link and the second unidirectional link belong to a same physical link.

With reference to the third aspect, in a second possible implementation manner, the packet generation module is configured to generate an ISIS LSP packet including the bit error information, where the ISIS LSP packet includes a first TLV field and a second TLV field, and the bit error information includes a bit error level that is carried in the first TLV field and that is used to indicate a bit error severity level, a bit error flag that is carried in the first TLV field and that is used to indicate a bit error type, and a link identifier that is carried in the second TLV field and that is used to indicate the link on which a bit error occurs; and the sending module is configured to send the ISIS LSP packet to all neighboring devices, and transfer the ISIS LSP packet to the another network device using all the neighboring devices.

A fourth aspect of the application provides a network device, including a receiving module configured to receive an ISIS packet that is sent by another network device and that includes bit error information, where the bit error information is used to indicate that a bit error occurs on a first unidirectional link from the network device to the another network device; and a traffic adjustment module configured to perform traffic adjustment according to the bit error information, so that the network device subsequently sends data to the another network device using another link other than the first unidirectional link.

With reference to the fourth aspect, in a first possible implementation manner, the traffic adjustment module is configured to increase a cost value of the first unidirectional link, so that the cost value of the first unidirectional link is at least greater than a cost value of a third unidirectional link, where the third unidirectional link is the another link from the network device to the another network device; or disconnect the first unidirectional link.

With reference to the first possible implementation manner of the fourth aspect, in a second possible implementation manner, the receiving module is configured to receive an ISIS hello packet that is sent by the another network device and that includes the bit error information, where the bit error information is carried in a TLV field of the ISIS hello packet, and the bit error information includes a bit error level used to indicate a bit error severity level, and a bit error flag used to indicate a bit error type; and the traffic adjustment module is further configured to determine, according to the bit error flag, to increase the cost value of the first unidirectional link or disconnect the first unidirectional link; and when determining to increase the cost value of the first unidirectional link, determine, according to the bit error level, an extent to which the cost value of the first unidirectional link is to be increased.

With reference to the first possible implementation manner of the fourth aspect, in a third possible implementation manner, the receiving module is configured to receive an ISIS LSP packet that is sent by the another network device and that includes the bit error information, where the ISIS LSP packet includes a first TLV field and a second TLV field, and the bit error information includes a bit error level that is carried in the first TLV field and that is used to indicate a bit error severity level, a bit error flag that is carried in the first TLV field and that is used to indicate a bit error type, and a link identifier that is carried in the second TLV field and that is used to indicate the link on which a bit error occurs; and determine, according to the bit error flag, to increase the cost value of the first unidirectional link or disconnect the first unidirectional link; and when determining to increase the cost value of the first unidirectional link, determine, according to the bit error level, an extent to which the cost value of the first unidirectional link is to be increased.

With reference to the fourth aspect or the first possible implementation manner of the fourth aspect, in a fourth possible implementation manner, the receiving module is configured to receive an ISIS hello packet that is sent by the another network device and that includes the bit error information, and an ISIS LSP packet that is sent by the another network device and that includes the bit error information; and the traffic adjustment module is configured to perform traffic adjustment according to the bit error information included in the ISIS LSP packet or according to the bit error information included in the ISIS hello packet.

A fifth aspect of the application provides a communications system, including a first network device and a second network device, where the first network device is the network device according to the fourth aspect of the application, and the second network device is the network device according to the third aspect of the application.

It can be learned from the foregoing that in the embodiments of the application, the ISIS protocol is extended, bit error information is added to an ISIS packet, and a bit error is indicated using the bit error information. Therefore, corresponding technical effects are achieved.

In some embodiments, a network device at one end may notify a network device at the other end of a detected link bit error status using an ISIS packet. The ISIS is a link layer protocol, and does not depend on an IP address. Therefore, the technical solutions in the application can be used in both a layer 2 network and a layer 3 network.

In some other embodiments, a network device at one end may learn a link bit error status by receiving bit error information in an ISIS packet sent by a network device at the other end, and then may perform traffic adjustment according to the bit error information, so as to subsequently send data using another link other than a bit error link. Therefore, a traffic loss is avoided.

BRIEF DESCRIPTION OF DRAWINGS

To describe the technical solutions in the embodiments of the application more clearly, the following briefly describes the accompanying drawings required for describing the embodiments. The accompanying drawings in the following description show merely some embodiments of the application, and a person of ordinary skill in the art may still derive other drawings from these accompanying drawings without creative efforts.

DESCRIPTION OF EMBODIMENTS

Embodiments of the application provide a bit error information transfer method, a network device, and a communications system, so as to resolve a problem that an existing BFD mechanism cannot be applied to a layer 2 network and cannot be widely applied.

To make a person skilled in the art understand the solutions in the application better, the following clearly and describes the technical solutions in the embodiments of the application with reference to the accompanying drawings in the embodiments of the application. The described embodiments are merely some rather than all of the embodiments of the application. All other embodiments obtained by a person of ordinary skill in the art based on the embodiments of the application without creative efforts shall fall within the protection scope of the application.

In the prior art, a bit error is usually transferred using a BFD mechanism. The BFD is a layer 3 UDP protocol, depends on an IP address, and cannot be applied to a layer 2 network. Therefore, currently, there is an urgent need to provide a solution for transferring a bit error in the layer 2 network. In particular, there is an urgent need for a bit error information transfer solution that can be applied to a layer 2 data center network in which the Transparent Interconnection of Lots of Links (TRILL) protocol is deployed. The TRILL is a routing protocol in which calculation is performed based on a link state in the layer 2 network. The TRILL is implemented by extending the ISIS protocol. The ISIS may directly run based on a link layer. Layer 2 networking may be implemented using the TRILL, and the TRILL is applicable to a scenario in which a virtual machine (VM) in a data center migrates within a network segment.

Inventors of the application propose, by studying and comparing multiple protocols applicable to the layer 2 network, a solution for transferring bit error information with an extended ISIS packet using the ISIS protocol.

The following describes in detail the technical solutions in the embodiments of the application using specific embodiments.

Embodiment 1

This embodiment of the application provides a bit error information transfer method. The method is used in an ISIS network in which the ISIS protocol is deployed. The ISIS protocol is not only an Interior Gateway Protocol (IGP), but also a link state protocol. Hello packets are sent between devices, so as to establish adjacencies hop by hop and form a network topology. Each adjacency is bidirectional and has a measurement value. Then, an LSP packet is sent, so as to send local routing information to each remote device. In the ISIS, route calculation is performed using a shortest path first (SPF) algorithm, so as to calculate a shortest path to each router in the network, and then guide packet forwarding.

Figure 1:
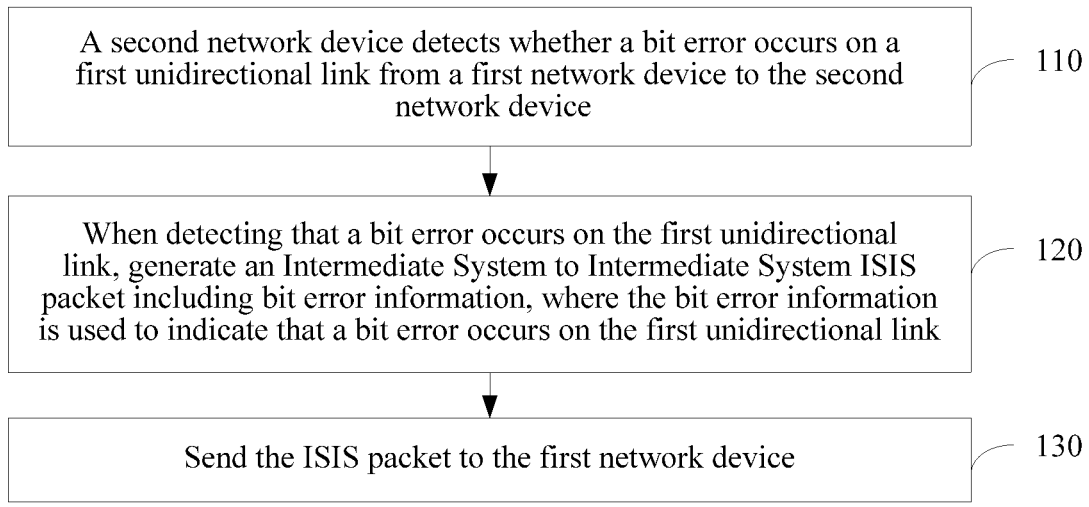
FIG. 1 is a schematic flowchart of a bit error information transfer method according to an embodiment of the application.

Referring to FIG. 1, the method in this embodiment of the application may include the following steps.

110. A second network device detects whether a bit error occurs on a first unidirectional link from a first network device to the second network device.

In this embodiment of the application, it is assumed that the second network device and the first network device are connected using at least one link. The at least one link may include the first unidirectional link from the first network device to the second network device, and a second unidirectional link from the second network device to the first network device, and the first unidirectional link and the second unidirectional link may belong to a same physical link. Optionally, the at least one link may further include a third unidirectional link from the first network device to the second network device, and a fourth unidirectional link from the second network device to the first network device, and the third unidirectional link and the fourth unidirectional link may belong to a same physical link, and so on. For example, the first unidirectional link may be a direct link from the first network device to the second network device, and the third unidirectional link may be a link on which the first network device and the second network device are connected using a third-party device.

It is assumed that the first network device currently sends data to the second network device using the first unidirectional link, the first unidirectional link is connected to a first port of the second network device, and the second network device receives, using the first port, the data sent by the first network device using the first unidirectional link. After receiving the data, the second network device first detects whether the received data has a bit error. The bit error means that a transmitted signal changes. For example, a digital signal 1 becomes 0, or a digital signal 0 becomes 1.

The method used by the second network device to detect a data bit error is not limited in this embodiment of the application. For example, the second network device may detect whether a parity bit in the received data is correct, so as to determine whether there is a bit error. Alternatively, the second network device may detect whether a digital signal of a prespecified data bit or digital signals of some prespecified data bits is or are correct, so as to determine whether there is a bit error.

120. When detecting that a bit error occurs on the first unidirectional link, generate an ISIS packet including bit error information, where the bit error information is used to indicate that the bit error occurs on the first unidirectional link.

In this embodiment of the application, a conventional ISIS packet is extended, the bit error information is added to the ISIS packet, and a link bit error status is indicated using the bit error information. If the second network device detects that the data received using the first unidirectional link has a bit error, the second network device correspondingly generates the ISIS packet including the bit error information, and indicates, using the bit error information included in the generated ISIS packet, that the bit error occurs on the first unidirectional link.

The ISIS packet generally includes a TLV field. In some embodiments of the application, the TLV field of the ISIS packet may be extended, and the bit error information is carried in the extended TLV field. It should be noted that in some other embodiments of the application, the bit error information may alternatively be carried in another field of the ISIS packet. This is not limited in this specification. In this specification, an example in which the bit error information is carried in the TLV field is used for description.

Type in the TLV field is used to indicate a type of the TLV field, that is, the TLV field is a field used to indicate a bit error. Length in the TLV is used to indicate a length of the TLV field. Value in the TLV is used to indicate the bit error information. In some embodiments of the application, bit errors may be classified into several different bit error types, and the different bit error types are indicated using different values in value. Alternatively, bit errors may be classified into different bit error severity levels, and the different bit error severity levels are indicated using different values in value.

In this embodiment of the application, the ISIS packet may be an ISIS hello packet, an ISIS LSP packet, or the like. That is, the bit error information may be carried in the ISIS hello packet, or the bit error information may be carried in the ISIS LSP packet.

130. Send the ISIS packet to the first network device.

In some embodiments of the application, the ISIS packet including the bit error information is the ISIS hello packet. The second network device may send the ISIS hello packet to the first network device using the second unidirectional link. The second unidirectional link and the first unidirectional link belong to the same physical link. In this case, the ISIS hello packet may not carry a link identifier of the first unidirectional link.

In some other embodiments of the application, the ISIS packet including the bit error information is the ISIS LSP packet. The second network device may send the ISIS LSP packet to the first network device using another link such as the foregoing third unidirectional link. In this case, the ISIS LSP packet needs to carry a link identifier of the first unidirectional link.

After receiving the ISIS packet that is sent by the second network device and that carries the bit error information, the first network device learns, according to the bit error information in the ISIS packet, that the bit error occurs on the first unidirectional link, so that the first network device may correspondingly perform traffic adjustment to avoid a data loss. The traffic adjustment may include increasing a cost value of the first unidirectional link, or disconnecting the first unidirectional link.

An example of increasing the cost value is used. The cost value of the first unidirectional link may be at least greater than a cost value of the third unidirectional link. Then, when continuing to send data, the first network device automatically searches for a link whose cost value is lowest, because the cost value indicates link performance, and a lower cost value indicates better link performance. The first network device subsequently sends data to the second network device using the third unidirectional link whose cost value is lower. The third unidirectional link is fault-free, and no bit error occurs on the third unidirectional link. Therefore, a traffic loss may be avoided.

An example of disconnecting the first unidirectional link is used. Because the first unidirectional link is disconnected, the first network device can subsequently send data to the second network device only using another link such as the third unidirectional link. The third unidirectional link is fault-free, and no bit error occurs on the third unidirectional link. Therefore, a traffic loss may be avoided.

In some embodiments of the application, the generating an ISIS packet including bit error information may include generating an ISIS hello packet including the bit error information. The bit error information is carried in a TLV field of the ISIS hello packet, and the bit error information includes a bit error level used to indicate a bit error severity level, and a bit error flag used to indicate a bit error type. The sending the ISIS packet to the first network device may include sending the ISIS hello packet to the first network device using a second unidirectional link from the second network device to the first network device. The first unidirectional link and the second unidirectional link belong to a same physical link.

In some other embodiments of the application, the generating an ISIS packet including bit error information includes generating an ISIS LSP packet including the bit error information. The ISIS LSP packet includes a first TLV field and a second TLV field. The bit error information includes a bit error level that is carried in the first TLV field and that is used to indicate a bit error severity level, a bit error flag that is carried in the first TLV field and that is used to indicate a bit error type, and a link identifier that is carried in the second TLV field and that is used to indicate the link on which a bit error occurs. The sending the ISIS packet to the first network device includes sending the ISIS LSP packet to all neighboring devices of the second network device, and transferring the ISIS LSP packet to the first network device using all the neighboring devices. The LSP packet is propagated in a networkwide flood manner, and therefore, the ISIS LSP packet can be networkwide propagated using the neighboring devices provided that the ISIS LSP packet is sent to the neighboring devices, so that the first network device receives the ISIS LSP packet sent by the second network device.

It may be understood that the foregoing solution in this embodiment of the application may be implemented by an ISIS network device.

It can be learned from the foregoing that in this embodiment of the application, using a technical solution in which the ISIS protocol is extended, bit error information is carried in an ISIS packet, and the bit error information is used to indicate a bit error, the following technical effects are achieved.

A network device at one end may notify a network device at the other end of a detected link bit error status using an ISIS packet. The ISIS is a link layer protocol, does not depend on an IP address, can be used in both a layer 2 network and a layer 3 network, and can also be used in a data center in which the TRILL protocol is deployed. In addition, the ISIS is more widely applied than BFD, and most network devices support the ISIS. Therefore, for a network that has no BFD deployment feature but supports the ISIS, a BFD mechanism may be completely replaced by the solution in the application.

Embodiment 2

Figure 2:
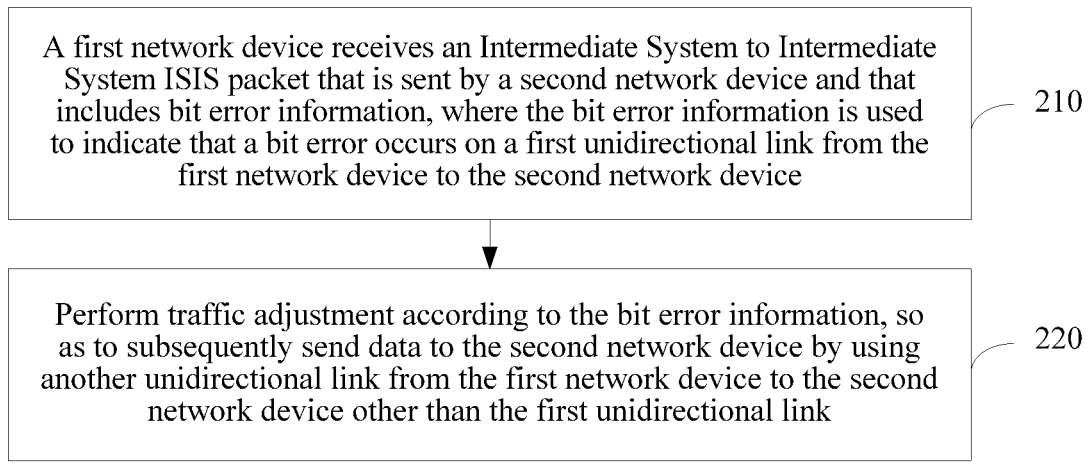
FIG. 2 is a schematic flowchart of a bit error information transfer method according to another embodiment of the application.

Referring to FIG. 2, this embodiment of the application provides another bit error information transfer method. The method may include the following steps.

210. A first network device receives an ISIS packet that is sent by a second network device and that includes bit error information, where the bit error information is used to indicate that a bit error occurs on a first unidirectional link from the first network device to the second network device.

220. Perform traffic adjustment according to the bit error information, so as to subsequently send data to the second network device using another link other than the first unidirectional link.

In some embodiments of the application, the performing traffic adjustment according to the TLV field includes increasing a cost value of the first unidirectional link, so that the cost value of the first unidirectional link is at least greater than a cost value of a third unidirectional link, where the third unidirectional link is the another link from the first network device to the second network device; or disconnecting the first unidirectional link.

In some embodiments of the application, the receiving, by a first network device, an ISIS packet that is sent by a second network device and that includes bit error information includes receiving, by the first network device, an ISIS hello packet that is sent by the second network device and that includes the bit error information. The bit error information is carried in a TLV field of the ISIS hello packet, and the bit error information includes a bit error level used to indicate a bit error severity level, and a bit error flag used to indicate a bit error type. Correspondingly, the performing traffic adjustment according to the TLV field includes determining, according to the bit error flag, to increase the cost value of the first unidirectional link or disconnect the first unidirectional link; and when determining to increase the cost value of the first unidirectional link, determining, according to the bit error level, an extent to which the cost value of the first unidirectional link is to be increased. For example, a higher bit error level indicates a larger extent to which the cost value of the first unidirectional link is to be increased.

In some embodiments of the application, the receiving, by a first network device, an ISIS packet that is sent by a second network device and that includes bit error information includes receiving, by the first network device, an ISIS LSP packet that is sent by the second network device and that includes the bit error information. The ISIS LSP packet includes a first TLV field and a second TLV field. The bit error information includes a bit error level that is carried in the first TLV field and that is used to indicate a bit error severity level, a bit error flag that is carried in the first TLV field and that is used to indicate a bit error type, and a link identifier that is carried in the second TLV field and that is used to indicate the link on which a bit error occurs. Correspondingly, the performing traffic adjustment according to the TLV field includes determining, according to the bit error flag, to increase the cost value of the first unidirectional link or disconnect the first unidirectional link; and when determining to increase the cost value of the first unidirectional link, determining, according to the bit error level, an extent to which the cost value of the first unidirectional link is to be increased. For example, a higher bit error level indicates a larger extent to which the cost value of the first unidirectional link is to be increased.

In some embodiments of the application, the receiving, by a first network device, an ISIS packet that is sent by a second network device and that includes bit error information includes receiving, by the first network device, an ISIS hello packet that is sent by the second network device and that includes the bit error information, and an ISIS LSP packet that is sent by the second network device and that includes the bit error information. The performing traffic adjustment according to the bit error information includes performing traffic adjustment according to the bit error information included in the ISIS LSP packet or according to the bit error information included in the ISIS hello packet. Different priorities may be preassigned to the ISIS LSP packet and the ISIS hello packet. When receiving the ISIS LSP packet and the ISIS hello packet, the first network device performs traffic adjustment according to bit error information carried in a packet whose priority is higher, such as the ISIS LSP packet.

It may be understood that the foregoing solution in this embodiment of the application may be implemented by an ISIS network device.

It can be learned from the foregoing that in this embodiment of the application, using a technical solution in which the ISIS protocol is extended, bit error information is added to an ISIS packet, and the bit error information is used to indicate a bit error, the following technical effects are achieved.

A network device at one end may learn a link bit error status by receiving bit error information in an ISIS packet sent by a network device at the other end; and then may perform traffic adjustment according to the learned bit error information, so as to subsequently send data using another link other than a bit error link. Therefore, a traffic loss is avoided.

The ISIS is a link layer protocol, does not depend on an IP address, and can be used in both a layer 2 network and a layer 3 network. For example, the ISIS can also be used in a data center in which the TRILL protocol is deployed. In addition, the ISIS is more widely applied than BFD, and most network devices support the ISIS. Therefore, for a network that has no BFD deployment feature but supports the ISIS, a BFD mechanism may be completely replaced by the solution in the application.

Embodiment 3

Based on the foregoing Embodiment 1 and Embodiment 2, this embodiment of the application provides another bit error information transfer method. In this embodiment, the ISIS packet may be an ISIS hello packet. In this embodiment, a TLV field may be added to the ISIS hello packet, and bit error information is carried in the added TLV field.

In an implementation manner, a structure of the TLV field may be shown in Table 1.

TABLE 1

| | |
|---|---|
| TLV Type | 1 Byte, the Type of TLV, To be defined. |
| Length | 1 Byte, the Length of the Value. |
| ErrorLevel   ErrorFlag | 1 Byte, ErrorLevel (6 bits), ErrorFlag (2 bits). |

It can be seen from Table 1 that the TLV field may include three parts: type, length, and value. Each part occupies one byte (byte). Value may further include two parts: ErrorLevel (bit error level) and ErrorFlag (bit error flag). ErrorLevel may occupy six bits (bits), and ErrorFlag may occupy two bits.

Type in the TLV is used to indicate a type of the TLV field, that is, indicate that the TLV field is a field used to indicate a bit error. Length in the TLV is used to indicate a length of the TLV field. Value in the TLV is used to indicate bit error information. Further, ErrorLevel is used to identify a bit error severity level, and ErrorFlag is used to indicate a bit error type.

For example, ErrorFlag may indicate four bit error types:
00, indicating that there is no bit error and no unidirectional link fault;
01, indicating that there is a bit error before correction, but no bit error after correction;
10, indicating that there is a bit error after correction; and
11, indicating that there is a unidirectional link fault (down).

For example, ErrorLevel may indicate three bit error severity levels. The three bit error severity levels may be respectively indicated using low, media (medium), and high.

In this embodiment of the application, some devices have a capability of correcting a bit error. After detecting a bit error, a device automatically corrects the bit error. If a bit error still exists after correction, the bit error is a bit error after correction. Compared with the bit error after correction, a bit error before correction is a bit error that is normally received and that is not corrected. For example, some devices have no capability of correcting a bit error, and a bit error of received data is a bit error before correction.

In some embodiments of the application, a value of ErrorFlag may be set to 00, indicating that there is no bit error and no unidirectional link fault. In some other embodiments of the application, the TLV field may not be carried in the ISIS hello packet, indicating that there is no bit error and no unidirectional link fault.

Figure 3A:
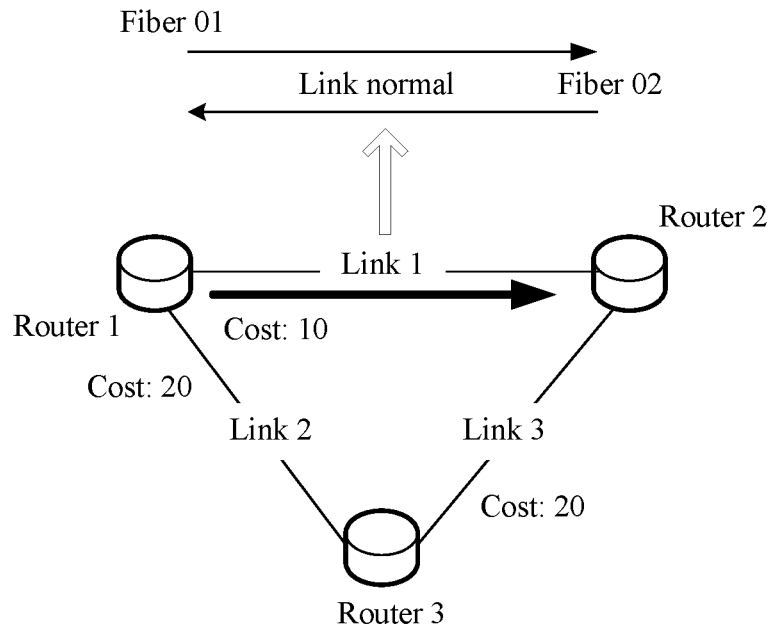
FIG. 3A to FIG. 3C are schematic network architecture diagrams of an application scenario of the application.

Referring to FIG. 3A, FIG. 3A is a schematic network architecture diagram of an application scenario in this embodiment. In the figure, there are three router devices in a network in which the ISIS protocol is deployed, which are respectively represented using a router 1, a router 2, and a router 3. In addition, any two router devices are connected using a physical link. The router 1 and the router 2 are connected using a physical link 1, the router 1 and the router 3 are connected using a link 2, and the router 3 and the router 2 are connected using a link 3. The foregoing physical links are bidirectional links. Each physical link may be functionally divided into two opposite unidirectional links. For example, the link 1 includes a unidirectional link fiber 01 from the router 1 to the router 2, and a unidirectional link fiber 02 from the router 2 to the router 1. It is assumed that all the links initially are fault-free, an optimal route from the router 1 to the router 2 is the fiber 01, and a cost value of the fiber 01 is 10. An alternative path from the router 1 to the router 2 is router 1→router 3→router 2, that is, includes the link 2 (whose cost value is 20) and the link 3 (whose cost value is 20). Therefore, a cost value of the alternative path is 40. The router 1 and the router 2 initially send data to each other using the fiber 01 and the fiber 02.

Figure 4:
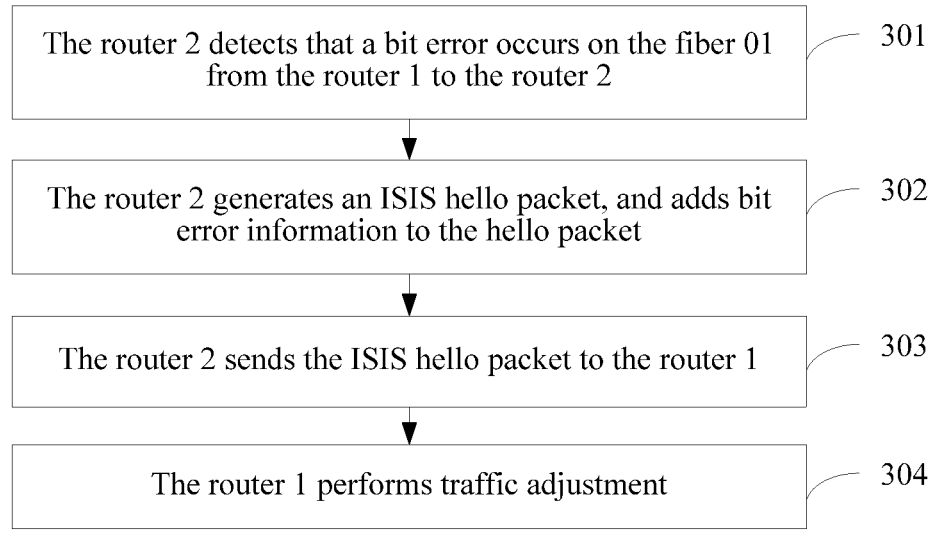
FIG. 4 is a schematic flowchart of a bit error information transfer method in an application scenario of the application.

As shown in FIG. 4, in this embodiment, the bit error information transfer method may include the following steps.

301. The router 2 detects that a bit error occurs on the fiber 01 from the router 1 to the router 2.

Figure 3B:
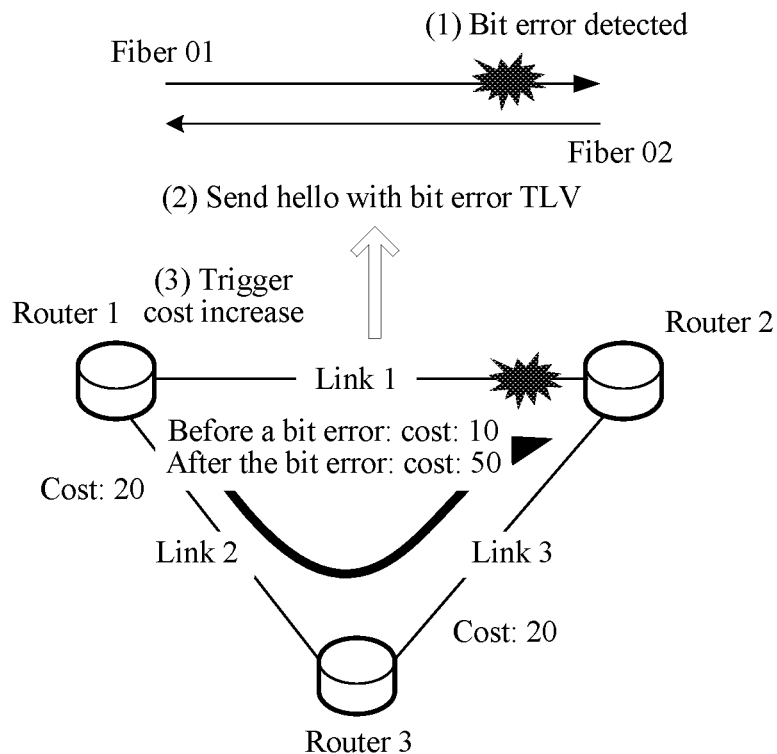

Referring to FIG. 3B, when a bit error occurs on the fiber 01, the router 2 may detect that the bit error occurs on the fiber 01. The detected bit error may be usually indicated using a bit error rate. Optionally, Bit error rate=Quantity of erroneous bits in transmission/Total quantity of transmitted bits. The router 2 may determine a bit error type and a bit error severity level according to the bit error rate. In an implementation manner, when the bit error rate is less than a, it may be considered that the bit error severity level is low. When the bit error rate is greater than or equal to a and less than or equal to b, it may be considered that the bit error severity level is media. When the bit error rate is greater than b, it may be considered that the bit error severity level is high. Values of a, b, and c may be set according to a requirement.

302. The router 2 generates an ISIS hello packet, and adds bit error information to the hello packet.

In order that the router 1 perceives the bit error, the router 2 generates the ISIS hello packet including a TLV field. The TLV field of the ISIS hello packet carries the bit error information, and the bit error information is used to indicate that the bit error occurs on the fiber 01. The determined bit error type may be carried in a bit error flag (ErrorFlag) of the TLV field, and the determined bit error severity level may be carried in a bit error level (ErrorLevel) of the TLV field.

303. The router 2 sends the ISIS hello packet to the router 1.

In this embodiment, the router 2 may send the generated ISIS hello packet to the router 1 using the unidirectional link from the router 2 to the router 1, that is, the fiber 02.

304. The router 1 performs traffic adjustment.

When receiving the ISIS hello packet sent by the router 2, the router 1 finds, by parsing the ISIS hello packet, the bit error information carried in the TLV field of the packet. The bit error information indicates that the bit error occurs on the fiber 01. The router 1 determines the bit error type and the bit error severity level that are included in the bit error information, and then triggers a traffic adjustment operation. The operation may include increasing the cost value of the fiber 01. For example, the cost value is 10 before the bit error occurs, and the cost value is adjusted 50. In this case, the optimal path from the router 1 to the router 2 is router 1→router 3 →router 2 (the cost value of the alternative path is 40). Then, subsequent traffic is transmitted using the alternative path (router 1→router 3→router 2). In this way, a traffic packet loss caused by transmitting traffic still using the fiber 01 may be avoided.

It should be noted that if the bit error is not detected in step 301, like the prior art, the bit error information is not carried in the ISIS hello packet sent by the router 2 to the router 1.

In this embodiment of the application, different traffic adjustment manners may be executed for different bit error severity levels. For example, when the bit error severity level is low or media, cost adjustment may be triggered to increase the cost value. When the bit error severity level is low, the cost value may be increased to a smaller extent. When the bit error severity level is media, the cost value may be increased to a larger extent. After the cost value is increased, route recalculation is triggered to select an optimal path. For another example, when the bit error severity level is high, removing an ISIS adjacency or disconnecting the currently used link may be considered.

Figure 3C:
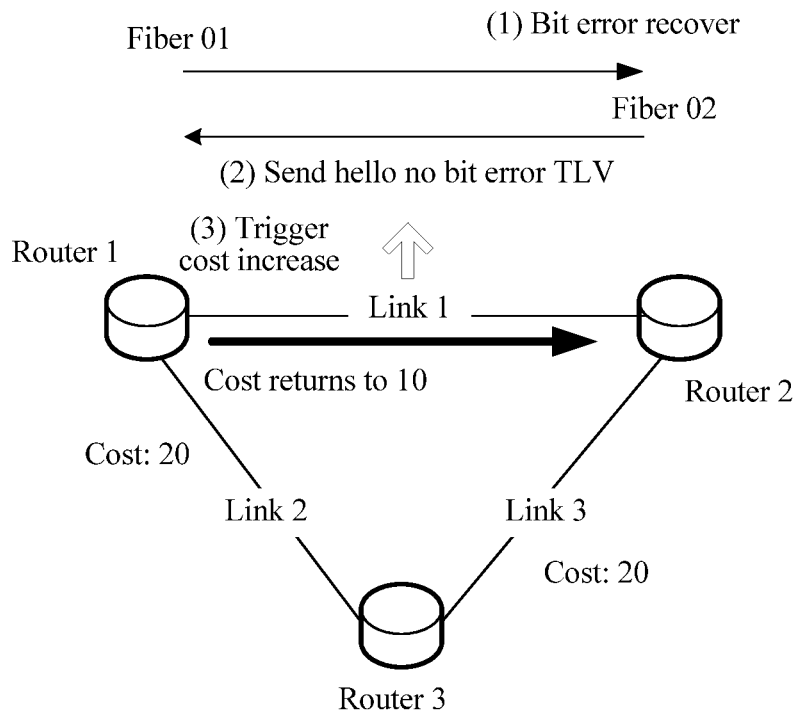

Referring to FIG. 3C, when the bit error is corrected, no bit error TLV is carried in a hello packet sent by the router 2. After receiving the hello packet, the router 1 triggers cost value adjustment so that a cost value returns to the normal value. Therefore, traffic from the router 1 to the router 2 may subsequently be transmitted still using the fiber 01.

It can be learned from the foregoing that in some feasible implementation manners of the application, using a technical solution in which the ISIS protocol is extended, a TLV field is added to an ISIS packet, and the TLV field is used to carry bit error information, the following technical effects are achieved:

1. By adding a bit error TLV field to an ISIS hello packet, so as to carry the bit error information, a network device may transfer a link bit error status using the ISIS hello packet, and then trigger traffic adjustment to avoid a traffic loss.

2. The ISIS is a link layer protocol, does not depend on an IP address, and can be used in both a layer 2 network and a layer 3 network. For example, the ISIS can also be used in a data center in which the TRILL protocol is deployed.

Embodiment 4

Based on the foregoing Embodiment 1 and Embodiment 2, this embodiment of the application provides still another bit error information transfer method. In this embodiment, the ISIS packet may be an ISIS LSP packet. The LSP is a packet used to announce a link and a link state between links, and is forwarded without depending on route calculation. Once a link is disconnected or an LSP is transferred using another router, a router updates a link state table and forwards the LSP.

In this embodiment, a TLV field may be added to the ISIS LSP packet, and bit error information is carried in the added TLV field. An advantage of LSP transfer is: An LSP is transferred in a networkwide flood manner, and link-related information may be transferred via multiple hops. This can be applied to a software-defined network (SDN) scenario. Even though a packet cannot be transferred using a link between devices at two ends, the packet may be transferred to a remote device using another path. In a network architecture diagram shown in FIG. 5, when the router 2 detects a bit error, if routers at both link ends of the link 1 cannot transmit/receive a packet, bit error information may be transferred using an ISIS LSP packet. Because the LSP is transferred in a networkwide flood manner, the ISIS LSP packet may be transferred to the router 1 using the link 3 and the link 2.

In this embodiment of the application, two types of SUB TLVs may be added to a neighbor (NBR) TLV of the LSP packet, so as to indicate a bit error status. The two types of SUB TLVs may respectively be referred to as a first TLV and a second TLV. It should be noted that the NBR TLV is equivalent to a parent TLV, the SUB TLV field is a child TLV, and multiple child TLVs may be added to the parent TLV.

In some implementation manners, a structure of the added first TLV field may be shown in Table 1. The structure of the added first TLV field may be the same as that defined for the TLV field in Embodiment 3. The first TLV field may include three parts: type, length, and value. Each part occupies one byte. Value may further include two parts: ErrorLevel (bit error level) and ErrorFlag (bit error flag). ErrorLevel may occupy six bits, and ErrorFlag may occupy two bits. ErrorLevel is used to identify a bit error severity level, and ErrorFlag is used to indicate a bit error type. Definitions of ErrorLevel and ErrorFlag may be the same as those in Embodiment 2. Details are not described herein again.

In some implementation manners, a structure of the added second TLV field may be shown in Table 2. The second TLV field is used to indicate a specific link on which a bit error occurs. The second TLV field includes a link identifier used to indicate a link on which a bit error occurs (that is, a bit error link).

TABLE 2

| | |
|---|---|
| SUB TLV Type | 1 Byte, the Type of SUB TLV, To be defined. |
| Length | 1 Byte, the Length of the Value. |
| Link Identified | Identify whick link has bit error |

The second TLV field may include three parts: type, length, and value. Each part occupies one byte. Value is used to indicate the bit error information, and may be a link identifier. A value of Link Identified is used to identify a link on which a bit error occurs.

Neighbors of ISIS are a broadcasting network and Peer to Peer (P2P) Computing. For the value of Link Identified, refer to the following (the value is not limited, and may be another representation value).

In terms of the broadcasting network, a system identifier (system ID) and a pseudonode ID may be used as the value of Link Identified. The system ID is used to indicate a device, and the pseudonode ID is used to indicate a link.

In terms of P2P, if borrowing an IP address is configured, a link may be indicated using link local/remote identifiers TLV (TLV type: 4) defined in the Request for Comments (RFC)(including almost all important text information about the Internet) 5307;

if an Internet Protocol version 4 (IPv4) address is configured, a link may be indicated using an IPv4 interface address (sub TLV type: 6) and an IPv4 neighbor address (sub TLV type: 8) that are defined in the RFC 5305; or if a global address of an IPv6 address is configured, a link may be indicated using an IPv6 interface address (sub TLV type: 12) and an IPv6 neighbor address sub-TLV (sub TLV type: 13) that are defined in the RFC 6119.

Figure 6:
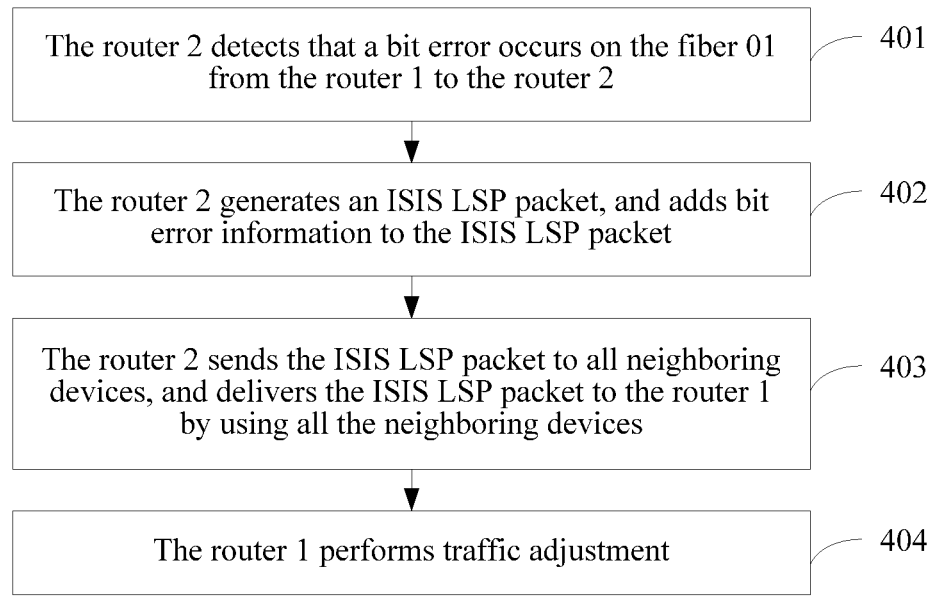
FIG. 6 is a schematic flowchart of a bit error information transfer method in another application scenario of the application.

As shown in FIG. 6, in this embodiment, the bit error information transfer method may include the following steps.

401. The router 2 detects that a bit error occurs on the fiber 01 from the router 1 to the router 2.

This step may be the same as step 301 in Embodiment 3. Details are not described herein again.

402. The router 2 generates an ISIS LSP packet, and adds bit error information to the ISIS LSP packet.

In order that the router 1 perceives the bit error, the router 2 generates the ISIS LSP packet including the bit error information. The bit error information is used to indicate that the bit error occurs on the fiber 01. The ISIS LSP packet includes a first TLV field and a second TLV field. The bit error information includes a bit error level that is carried in the first TLV field and that is used to indicate a bit error severity level, a bit error flag that is carried in the first TLV field and that is used to indicate a bit error type, and a link identifier that is carried in the second TLV field and that is used to indicate the link on which a bit error occurs.

403. The router 2 sends the ISIS LSP packet to all neighboring devices, and transfers the ISIS LSP packet to the router 1 using all the neighboring devices.

Figure 5:
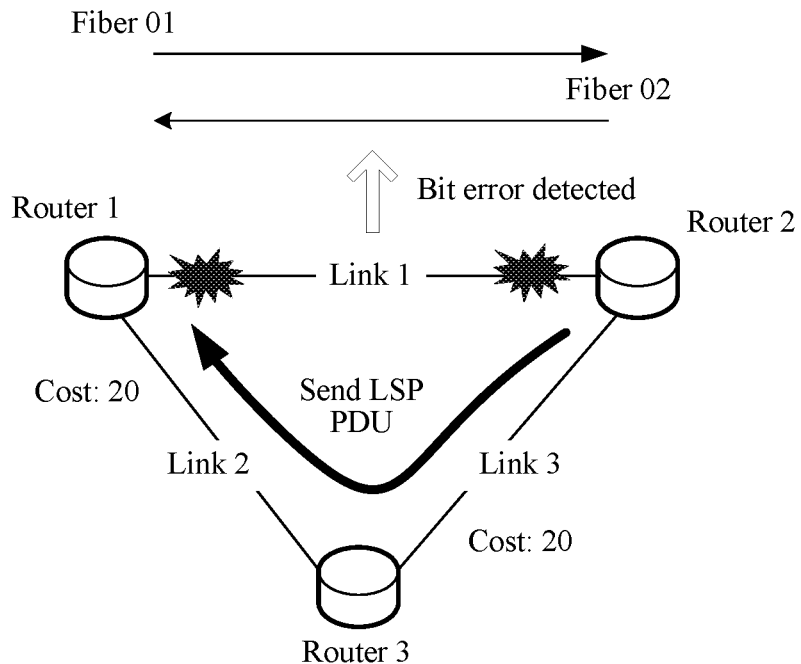
FIG. 5 is a schematic network architecture diagram of another application scenario of the application.

As shown in FIG. 5, the router 2 transfers, in a flood manner, the ISIS LSP packet to all neighboring devices of the router 2, including the router 3. After receiving the ISIS LSP packet, the rout 3 transfers, still in the flood manner, the ISIS LSP packet to all neighboring devices of the router 3, including the router 1. Then, the router 1 receives, using the router 3, the ISIS LSP packet sent by the router 2.

404. The router 1 performs traffic adjustment.

This step may be the same as step 304 in Embodiment 3. Details are not described herein again.

It should be noted that if the bit error is not detected in step 401, like the prior art, the bit error information is not carried in the ISIS LSP packet sent by the router 2 to the router 1.

Because the ISIS LSP packet is transferred in the networkwide flood manner, the method in this embodiment may be used to transfer bit error information when a bidirectional bit error occurs. The method may include the following steps.

a. When the link 1 to which the router 1 and the router 2 belong encounters a bidirectional fault, the router 2 detects that a bit error occurs on the fiber 01 from the router 1 to the router 2, and the router 1 detects that a bit error occurs on the fiber 02 from the router 2 to the router 1.

b. The router 2 generates a first ISIS LSP packet, and adds, to the first ISIS LSP packet, bit error information used to indicate the bit error on the fiber 01. The router 1 generates a second ISIS LSP packet, and adds, to the second ISIS LSP packet, bit error information used to indicate the bit error on the fiber 02.

c. The router 2 sends the first ISIS LSP packet to all neighboring devices of the router 2, and transfers the ISIS LSP packet to the router 1 using all the neighboring devices of the router 2. The router 1 sends the second ISIS LSP packet to all neighboring devices of the router 1, and transfers the ISIS LSP packet to the router 2 using all the neighboring devices of the router 1.

d. The router 1 receives the first ISIS LSP packet, the router 2 receives the second ISIS LSP packet, and the router 1 and the router 2 separately perform traffic adjustment. After the traffic adjustment, traffic from the router 1 to the router 2 is not transmitted using the fiber 01 (for example, is transmitted using router 1→router 3→router 2), and traffic from the router 2 to the router 1 is not transmitted using the fiber 02 (for example, is transmitted using router 2→router 3→router 1).

It can be learned from the foregoing that in some feasible implementation manners of the application, using a technical solution in which the ISIS protocol is extended, a TLV field is added to an ISIS packet, and the TLV field is used to carry bit error information, the following technical effects are achieved.

1. By adding a bit error TLV field to an ISIS LSP packet, so as to carry bit error information, a network device may transfer a link bit error status using the ISIS LSP packet, and then trigger traffic adjustment to avoid a traffic loss.

2. Using the method for transferring the ISIS LSP to all neighbors in a flood manner, finally, networkwide link bit error information of a network is collected in a link status database of each forwarding device in the network. Therefore, in a SDN transition network, any forwarding device that establishes a connection to a controller can transfer the networkwide link bit error information to the SDN controller, so that the SDN controller collects and manages all bit errors.

The SDN is a new network architecture, and mainly includes a northbound interface connected to an upper-layer application, the SDN controller, a switch (or a forwarding device) supporting control from the SDN controller, and a southbound interface between the controller and the switch. A mainstream implementation protocol for the southbound interface is OpenFlow in which a device can be directly managed and controlled. In the SDN, the controller collects all information. In the SDN, control and forwarding are separated, resulting in rational resource allocation and operation simplification. In addition, the SDN implements network openness using a programmability, and lays the foundation for network customization and innovation. An existing BFD mechanism can implement only single-hop transfer, and cannot be applied to a scenario in which the SDN controller needs to collect and manage all bit errors in the SDN network.

3. The ISIS is a link layer protocol, does not depend on an IP address, and can be used in both a layer 2 network and a layer 3 network. Therefore, the ISIS can also be used in a data center in which the TRILL protocol is deployed.

To better implement the foregoing solution in this embodiment of the application, the following further provides a related apparatus used to cooperatively implement the foregoing solution.

Embodiment 5

With reference to the foregoing Embodiment 3 and Embodiment 4, this embodiment of the application provides another bit error information transfer method. In the method, bit error information is transferred using both an ISIS hello packet and an ISIS LSP packet.

Figure 7:
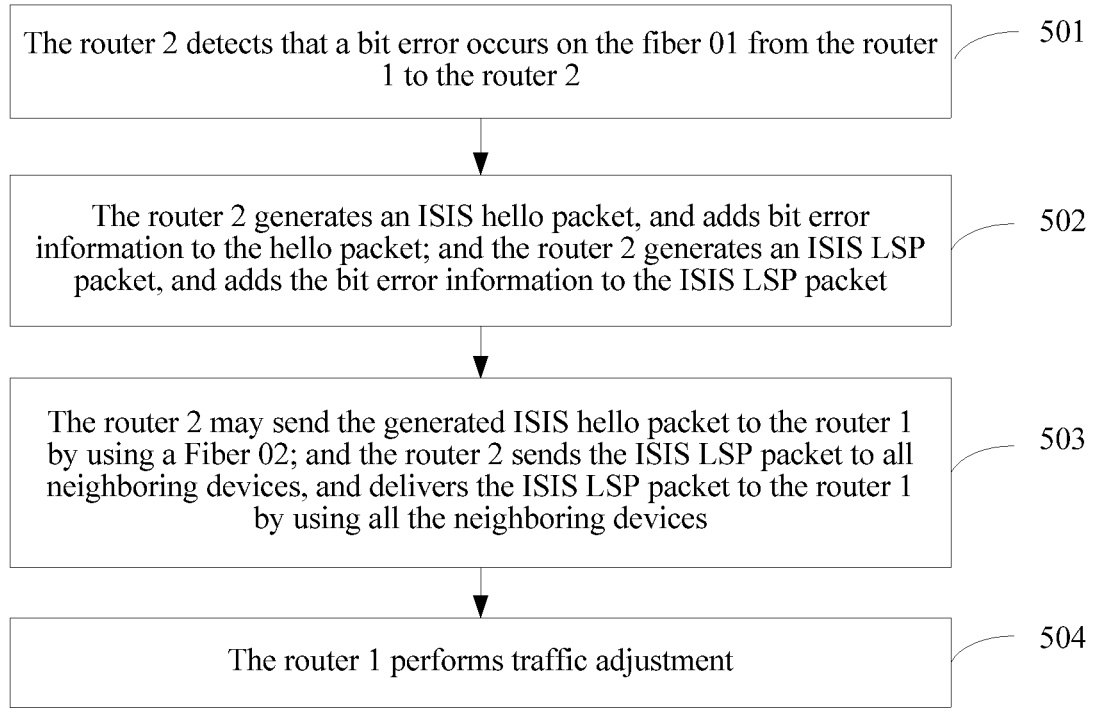
FIG. 7 is a schematic flowchart of a bit error information transfer method in still another application scenario of the application.

Referring to FIG. 7, in this embodiment, the bit error information transfer method may include the following steps.

501. The router 2 detects that a bit error occurs on the fiber 01 from the router 1 to the router 2.

This step may be the same as step 301 in Embodiment 3. Details are not described herein again.

502. The router 2 generates an ISIS hello packet, and adds bit error information to the hello packet; and the router 2 generates an ISIS LSP packet, and adds the bit error information to the ISIS LSP packet.

For details, refer to Embodiment 3 and Embodiment 4. Details are not described herein again.

503. The router 2 may send the generated ISIS hello packet to the router 1 using the fiber 02; and the router 2 sends the ISIS LSP packet to all neighboring devices, and transfers the ISIS LSP packet to the router 1 using all the neighboring devices.

For details, refer to Embodiment 3 and Embodiment 4. Details are not described herein again.

504. The router 1 performs traffic adjustment.

The router 1 may receive the ISIS hello packet and the ISIS LSP packet that are sent by the router 2. In some embodiments, a priority may be set. For example, if a higher priority is assigned to the ISIS LSP packet, traffic adjustment is performed based on the bit error information carried in the ISIS LSP packet. Certainly, a higher priority may be assigned to the ISIS hello packet, and traffic adjustment is performed based on the bit error information carried in the ISIS hello packet. For specific traffic adjustment operations, refer to Embodiment 3 and Embodiment 4. Details are not described herein again.

It should be noted that if the bit error is not detected in step 501, like the prior art, the bit error information is not carried in the ISIS hello packet and/or the ISIS LSP packet that are/is sent by the router 2 to the router 1.

It can be learned from the foregoing that in this embodiment of the application, the ISIS protocol is extended, bit error information is added to an ISIS packet, and the bit error information is used to indicate a bit error. Therefore, the following corresponding technical effects are achieved.

A network device at one end may notify a network device at the other end of a detected link bit error status using an ISIS packet. The ISIS is a link layer protocol, and does not depend on an IP address. Therefore, the technical solutions in the application can be used in both a layer 2 network and a layer 3 network. The network device at the other end may learn the link bit error status using the bit error information included in the received ISIS packet, and then may perform traffic adjustment according to the bit error information. The network device at the other end subsequently sends data using another link other than a bit error link. Therefore, a traffic loss is avoided.

Embodiment 6

Figure 8:
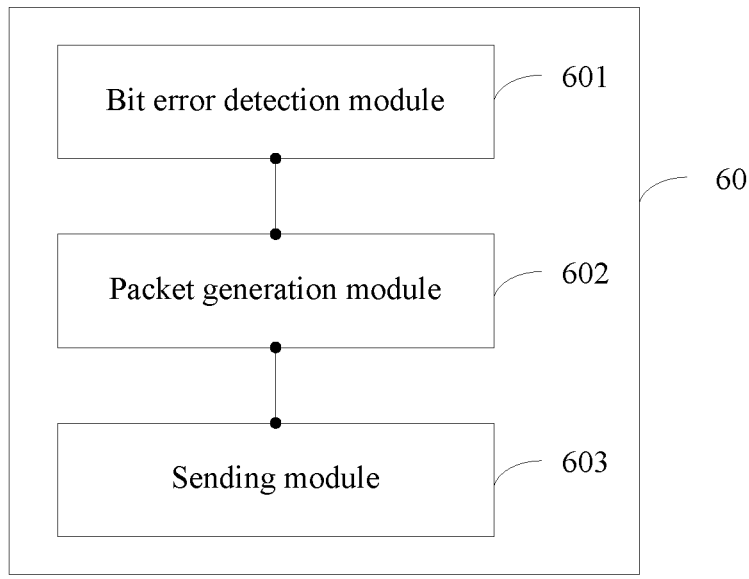
FIG. 8 is a schematic diagram of a network device according to an embodiment of the application.

Referring to FIG. 8, this embodiment of the application provides a network device 60, which may include a bit error detection module 601 configured to detect whether a bit error occurs on a first unidirectional link from another network device to the network device 60; a packet generation module 602 configured to, when it is detected that a bit error occurs on the first unidirectional link, generate an ISIS packet including bit error information, where the bit error information is used to indicate that the bit error occurs on the first unidirectional link; and a sending module 603 configured to send the ISIS packet to the another network device.

In some embodiments of the application, the packet generation module 602 is configured to generate an ISIS hello packet including the bit error information. The bit error information is carried in a TLV field of the ISIS hello packet, and the bit error information includes a bit error level used to indicate a bit error severity level, and a bit error flag used to indicate a bit error type. The sending module 603 is configured to send the ISIS hello packet to the another network device using a second unidirectional link from the network device to the another network device. The first unidirectional link and the second unidirectional link belong to a same physical link.

In some other embodiments of the application, the packet generation module 602 is configured to generate an ISIS LSP packet including the bit error information. The ISIS LSP packet includes a first TLV field and a second TLV field. The bit error information includes a bit error level that is carried in the first TLV field and that is used to indicate a bit error severity level, a bit error flag that is carried in the first TLV field and that is used to indicate a bit error type, and a link identifier that is carried in the second TLV field and that is used to indicate the link on which a bit error occurs. The sending module 603 is configured to send the ISIS LSP packet to all neighboring devices, and transfer the ISIS LSP packet to the another network device using all the neighboring devices.

The network device in this embodiment of the application may be an ISIS network device.

For detailed descriptions of the network device in this embodiment, refer to the content recorded in Embodiment 1. It should be noted that the network device in this embodiment is equivalent to the second network device in Embodiment 1, and the another network device in this embodiment is equivalent to the first network device in Embodiment 1.

It may be understood that functions of function modules in the network in this embodiment of the application may be implemented according to the method in the foregoing method embodiment. For a specific implementation process of the functions, refer to the related descriptions in the foregoing method embodiment. Details are not described herein again.

It can be learned from the foregoing that in some feasible implementation manners of the application, using a technical solution in which the ISIS protocol is extended, bit error information is carried in an ISIS packet, and the bit error information is used to indicate a bit error, the following technical effects are achieved.

A network device at one end may notify a network device at the other end of a detected link bit error status using an ISIS packet. The ISIS is a link layer protocol, does not depend on an IP address, can be used in both a layer 2 network and a layer 3 network, and can also be used in a data center in which the TRILL protocol is deployed. In addition, the ISIS is more widely applied than BFD, and most network devices support the ISIS. Therefore, for a network that has no BFD deployment feature but supports the ISIS, a BFD mechanism may be completely replaced by the solution in the application.

Embodiment 7

Figure 9:
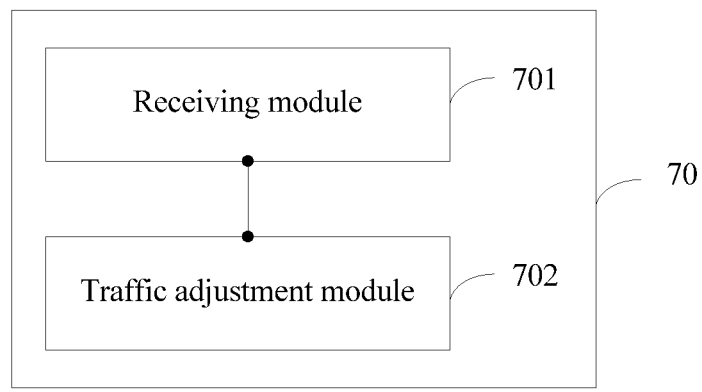
FIG. 9 is a schematic diagram of a network device according to another embodiment of the application.

Referring to FIG. 9, this embodiment of the application provides another network device 70, which may include a receiving module 701 configured to receive an ISIS packet that is sent by another network device and that includes bit error information, where the bit error information is used to indicate that a bit error occurs on a first unidirectional link from the network device to the another network device; and a traffic adjustment module 702 configured to perform traffic adjustment according to the bit error information, so that the network device subsequently sends data to the another network device using another link other than the first unidirectional link.

In some embodiments of the application, the traffic adjustment module 702 is configured to increase a cost value of the first unidirectional link, so that the cost value of the first unidirectional link is at least greater than a cost value of a third unidirectional link, where the third unidirectional link is the another link from the network device to the another network device; or disconnect the first unidirectional link.

In some embodiments of the application, the receiving module 701 is configured to receive an ISIS hello packet that is sent by the another network device and that includes the bit error information. The bit error information is carried in a TLV field of the ISIS hello packet, and the bit error information includes a bit error level used to indicate a bit error severity level, and a bit error flag used to indicate a bit error type. The traffic adjustment module 702 is further configured to determine, according to the bit error flag, to increase the cost value of the first unidirectional link or disconnect the first unidirectional link; and when determining to increase the cost value of the first unidirectional link, determine, according to the bit error level, an extent to which the cost value of the first unidirectional link is to be increased.

In some embodiments of the application, the receiving module 701 is configured to receive an ISIS LSP packet that is sent by the another network device and that includes the bit error information. The ISIS LSP packet includes a first TLV field and a second TLV field. The bit error information includes a bit error level that is carried in the first TLV field and that is used to indicate a bit error severity level, a bit error flag that is carried in the first TLV field and that is used to indicate a bit error type, and a link identifier that is carried in the second TLV field and that is used to indicate the link on which a bit error occurs. The traffic adjustment module 702 is further configured to determine, according to the bit error flag, to increase the cost value of the first unidirectional link or disconnect the first unidirectional link; and when determining to increase the cost value of the first unidirectional link, determine, according to the bit error level, an extent to which the cost value of the first unidirectional link is to be increased.

In some embodiments of the application, the receiving module 701 is configured to receive an ISIS hello packet that is sent by the another network device and that includes the bit error information, and an ISIS LSP packet that is sent by the another network device and that includes the bit error information. The traffic adjustment module 702 is configured to perform traffic adjustment according to the bit error information included in the ISIS LSP packet or according to the bit error information included in the ISIS hello packet.

The network device in this embodiment of the application may be an ISIS network device.

For detailed descriptions of the network device in this embodiment, refer to the content recorded in Embodiment 2. It should be noted that the network device in this embodiment is equivalent to the first network device in Embodiment 2, and the another network device in this embodiment is equivalent to the second network device in Embodiment 2.

It may be understood that functions of function modules in the network in this embodiment of the application may be implemented according to the method in the foregoing method embodiment. For a specific implementation process of the functions, refer to the related descriptions in the foregoing method embodiment. Details are not described herein again.

It can be learned from the foregoing that in some feasible implementation manners of the application, using a technical solution in which the ISIS protocol is extended, bit error information is carried in an ISIS packet, and the bit error information is used to indicate a bit error, the following technical effects are achieved.

A network device at one end may learn a link bit error status by receiving bit error information in an ISIS packet sent by a network device at the other end; and then may perform traffic adjustment according to the learned bit error information, so as to subsequently send data using another link other than a bit error link. Therefore, a traffic loss is avoided.

The ISIS is a link layer protocol, does not depend on an IP address, and can be used in both a layer 2 network and a layer 3 network. For example, the ISIS can also be used in a data center in which the TRILL protocol is deployed. In addition, the ISIS is more widely applied than BFD, and most network devices support the ISIS. Therefore, for a network that has no BFD deployment feature but supports the ISIS, a BFD mechanism may be completely replaced by the solution in the application.

An embodiment of the application further provides a computer storage medium. The computer storage medium may store a program. When being executed, the program includes some or all of the steps of the bit error information transfer method recorded in the foregoing method embodiment.

Figure 10:
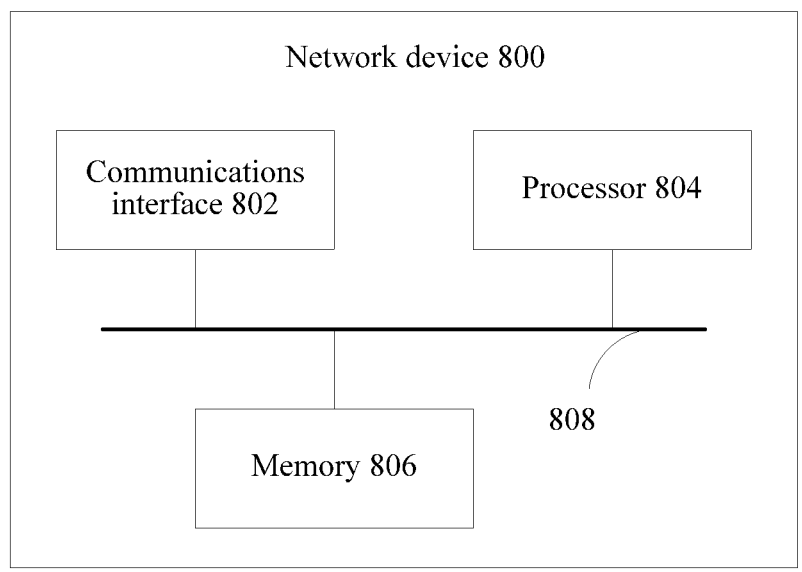
FIG. 10 is a schematic structural diagram of a network device according to an embodiment of the application.

Referring to FIG. 10, an embodiment of the application further provides a network device 800. The network device 800 may be a microprocessing computer. For example, the network device 800 may be one of a general-purpose computer, a customized machine, a mobile phone terminal, a tablet computer, or another portable device. The network device 800 includes a processor 804, a memory 806, a communications interface 802, and a bus 808. Using the bus 808, the processor 804, the memory 806, and the communications interface 802 are connected and communicate with each other.

The bus 808 may be an industry standard architecture (ISA) bus, a peripheral component interconnect (PCI) bus, an extended industry standard architecture (EISA) bus, or the like. The bus may be one or more of an address bus, a data bus, or a control bus. For ease of representation, only one bold line is used in FIG. 8 to represent the bus 808. However, this does not mean that there is only one bus or only one type of bus.

The memory 806 is configured to store executable program code, and the program code includes a computer operation instruction. When the network device 800 executes the program code, the network device 800 may complete steps 110 to 130 in Embodiment 1, and may also implement all functions of the network device 60 in Embodiment 6. The memory 806 may include a high-speed random access memory (RAM). Optionally, the memory 806 may include a non-volatile memory. For example, the memory 806 may include a magnetic disk memory.

The processor 804 may be a central processing unit (CPU), or the processor 804 may be an application-specific integrated circuit (ASIC), or the processor 804 may be one or more integrated circuits configured to implement this embodiment of the application.

The communications interface 802 is configured to perform the operation, in Embodiment 1 and Embodiment 6, of sending the ISIS packet to the first network device or the another network device.

The processor 804 is configured to read the instruction stored in the memory 806, so as to perform the operations, in Embodiment 1 and Embodiment 6, of detecting whether a bit error occurs on a first unidirectional link from a first network device to the second network device; and when detecting that a bit error occurs on the first unidirectional link, generating an ISIS packet including bit error information, where the bit error information is used to indicate that the bit error occurs on the first unidirectional link.

Optionally, the processor 804 is further configured to generate an ISIS hello packet including the bit error information. The bit error information is carried in a TLV field of the ISIS hello packet, and the bit error information includes a bit error level used to indicate a bit error severity level, and a bit error flag used to indicate a bit error type.

Optionally, the communications interface 802 is further configured to send the ISIS hello packet to the first network device using a second unidirectional link from the second network device to the first network device. The first unidirectional link and the second unidirectional link belong to a same physical link.

Optionally, the processor 804 is further configured to generate an ISIS LSP packet including the bit error information. The ISIS LSP packet includes a first TLV field and a second TLV field. The bit error information includes a bit error level that is carried in the first TLV field and that is used to indicate a bit error severity level, a bit error flag that is carried in the first TLV field and that is used to indicate a bit error type, and a link identifier that is carried in the second TLV field and that is used to indicate the link on which a bit error occurs.

Optionally, the communications interface 802 is further configured to send the ISIS LSP packet to all neighboring devices, and transfer the ISIS LSP packet to the first network device using all the neighboring devices.

It should be noted that function units of the network device provided in Embodiment 7 of the application may be a specific implementation based on the method provided in Embodiment 1 and the functions of the apparatus provided in Embodiment 6. Definitions and descriptions of terms are consistent with those in Embodiment 1 and Embodiment 6. Details are not described herein again.

The network device provided in this embodiment of the application extends the ISIS protocol, adds bit error information to an ISIS packet, and indicates a bit error using the bit error information. Therefore, the bit error information is transferred using the ISIS packet. This can be used in both a layer 2 network and a layer 3 network.

Figure 11:
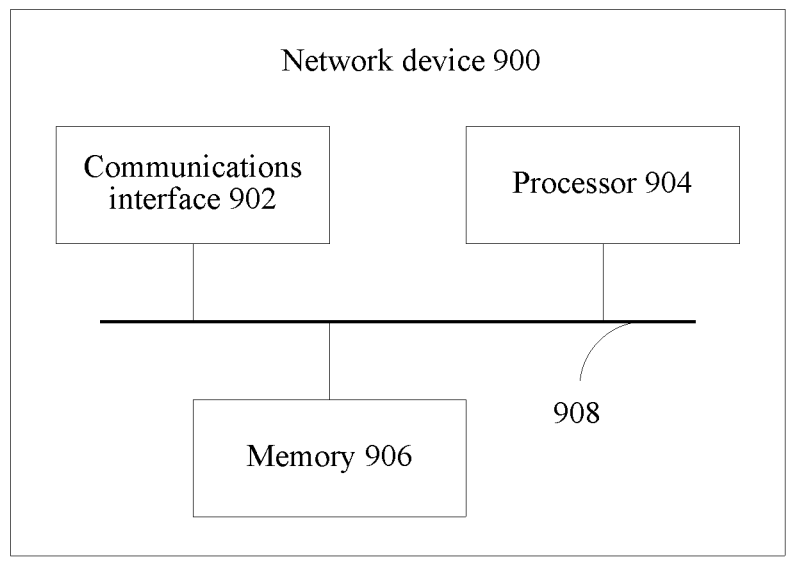
FIG. 11 is a schematic structural diagram of another network device according to an embodiment of the application.

Referring to FIG. 11, an embodiment of the application provides a network device 900. The network device 900 may be a microprocessing computer. For example, the network device 900 may be one of a general-purpose computer, a customized machine, a mobile phone terminal, a tablet computer, or another portable device. The network device 900 includes a processor 904, a memory 906, a communications interface 902, and a bus 908. Using the bus 908, the processor 904, the memory 906, and the communications interface 902 are connected and communicate with each other.

The bus 908 may be an ISA bus, a PCI bus, an EISA bus, or the like. The bus may be one or more of an address bus, a data bus, or a control bus. For ease of representation, only one bold line is used in FIG. 9 to represent the bus 908. However, this does not mean that there is only one bus or only one type of bus.

The memory 906 is configured to store executable program code, and the program code includes a computer operation instruction. When the network device 900 executes the program code, the network device 900 may complete steps 210 to 220 in Embodiment 2, and may also implement all functions of the network device 70 in Embodiment 7. The memory 906 may include a high-speed RAM. Optionally, the memory 906 may include a non-volatile memory. For example, the memory 906 may include a magnetic disk memory.

The processor 904 may be a central processing unit CPU, or the processor 904 may be an ASIC, or the processor 904 may be one or more integrated circuits configured to implement this embodiment of the application.

The communications interface 902 is configured to perform the operation, in Embodiment 2 and Embodiment 7, of receiving an ISIS packet that is sent by a second network device and that includes bit error information, where the bit error information is used to indicate that a bit error occurs on a first unidirectional link from the first network device to the second network device.

The processor 904 is configured to read the instruction stored in the memory 906, so as to perform the operation, in Embodiment 2 and Embodiment 7, of performing traffic adjustment according to the bit error information, so as to subsequently send data to the second network device using another link other than the first unidirectional link.

Optionally, the processor 904 is further configured to increase a cost value of the first unidirectional link, so that the cost value of the first unidirectional link is at least greater than a cost value of a third unidirectional link, where the third unidirectional link is the another link from the first network device to the second network device; or disconnect the first unidirectional link.

Optionally, the communications interface 902 is further configured to receive an ISIS hello packet that is sent by the second network device and that includes the bit error information. The bit error information is carried in a TLV field of the ISIS hello packet, and the bit error information includes a bit error level used to indicate a bit error severity level, and a bit error flag used to indicate a bit error type.

Optionally, the processor 904 is further configured to determine, according to the bit error flag, to increase the cost value of the first unidirectional link or disconnect the first unidirectional link; and when determining to increase the cost value of the first unidirectional link, determine, according to the bit error level, an extent to which the cost value of the first unidirectional link is to be increased.

Optionally, the communications interface 902 is further configured to receive an ISIS LSP packet that is sent by the second network device and that includes the bit error information. The ISIS LSP packet includes a first TLV field and a second TLV field. The bit error information includes a bit error level that is carried in the first TLV field and that is used to indicate a bit error severity level, a bit error flag that is carried in the first TLV field and that is used to indicate a bit error type, and a link identifier that is carried in the second TLV field and that is used to indicate the link on which a bit error occurs.

Optionally, the processor 904 is further configured to determine, according to the bit error flag, to increase the cost value of the first unidirectional link or disconnect the first unidirectional link; and when determining to increase the cost value of the first unidirectional link, determine, according to the bit error level, an extent to which the cost value of the first unidirectional link is to be increased.

Optionally, the communications interface 902 is further configured to receive an ISIS hello packet that is sent by the second network device and that includes the bit error information, and an ISIS LSP packet that is sent by the second network device and that includes the bit error information.

Optionally, the processor 904 is further configured to perform traffic adjustment according to the bit error information included in the ISIS LSP packet or according to the bit error information included in the ISIS hello packet.

It should be noted that function units of the network device provided in this embodiment of the application may be a specific implementation based on the method provided in Embodiment 2 and the functions of the apparatus provided in Embodiment 7. Definitions and descriptions of terms are consistent with those in Embodiment 2 and Embodiment 7. Details are not described herein again.

The network device provided in this embodiment of the application extends the ISIS protocol, adds bit error information to an ISIS packet, and indicates a bit error using the bit error information. Therefore, the bit error information is transferred using the ISIS packet. This can be used in both a layer 2 network and a layer 3 network.

In the foregoing embodiments, the descriptions of the embodiments have respective focuses. For a part that is not described in detail in an embodiment, refer to related descriptions in other embodiments.

It should be noted that, for ease of description, all the foregoing method embodiments are described as a series of action combinations. However, a person skilled in the art should understand that the application is not limited to the described sequence of the actions, because according to the application, some steps may be performed in another sequence or performed simultaneously. In addition, a person skilled in the art should also understand that all the embodiments described in this specification are examples of embodiments, and the involved actions and modules are not necessarily mandatory to the application.

A person of ordinary skill in the art may understand that all or some of the steps of the methods in the foregoing embodiments may be implemented by a program instructing relevant hardware. The program may be stored in a computer readable storage medium. The storage medium may include a read-only memory (ROM), a RAM, a magnetic disk, an optical disc, or the like.

The foregoing describes in detail the bit error information transfer method, the network device, and the communications system that are provided in the embodiments of the application. In this specification, the principle and implementation manners of the application are described using specific examples. The foregoing descriptions of the embodiments of the application are merely used to help understand the method and core ideas of the application. In addition, a person of ordinary skill in the art can make variations and modifications in terms of the specific implementation manners and application scopes according to the ideas of the application. In conclusion, the content of this specification shall not be construed as a limitation to the application.

What is claimed is:

1. A bit error information transfer method, comprising:
    detecting, by a second network device, whether a bit error occurs on a first unidirectional link from a first network device to the second network device;
    generating an Intermediate System to Intermediate System (ISIS) packet comprising bit error information when detecting that a bit error occurs on the first unidirectional link, wherein the bit error information indicates that the bit error occurs on the first unidirectional link; and
    sending the ISIS packet to the first network device.

2. The bit error information transfer method of claim 1, wherein generating the ISIS packet comprising the bit error information comprises generating an ISIS hello packet comprising the bit error information, wherein the bit error information is carried in a type-length-value (TLV) field of the ISIS hello packet, wherein the bit error information comprises a bit error level used to indicate a bit error severity level and a bit error flag used to indicate a bit error type, wherein sending the ISIS packet to the first network device comprises sending the ISIS hello packet to the first network device using a second unidirectional link from the second network device to the first network device, and wherein the first unidirectional link and the second unidirectional link belong to a same physical link.

3. The bit error information transfer method of claim 1, wherein generating the ISIS packet comprising the bit error information comprises generating an ISIS link state packet (LSP) packet comprising the bit error information, wherein the ISIS LSP packet comprises a first type-length-value (TLV) field and a second TLV field, wherein the bit error information comprises a bit error level carried in the first TLV field and indicating a bit error severity level, a bit error flag carried in the first TLV field and indicating a bit error type, and a link identifier carried in the second TLV field and indicating the link on which a bit error occurs, and wherein sending the ISIS packet to the first network device comprises:
    sending the ISIS LSP packet to all neighboring devices; and
    transferring the ISIS LSP packet to the first network device using all neighboring devices.

4. A bit error information transfer method, comprising:
    receiving, by a first network device, an Intermediate System to Intermediate System (ISIS) packet from a second network device and that comprises bit error information, wherein the hit error information indicates that a bit error occurs on a first unidirectional link from the first network device to the second network device; and
    performing traffic adjustment according to the hit error information to subsequently send data to the second network device using another unidirectional link from the first network device to the second network device other than the first unidirectional link.

5. The bit error information transfer method of claim 4, wherein performing traffic adjustment according to the bit error information comprises at least one of:
    increasing a cost value of the first unidirectional link such that the cost value of the first unidirectional link is at least greater than a cost value of a third unidirectional link, wherein the third unidirectional link is the another unidirectional link from the first network device to the second network device; or
    disconnecting the first unidirectional link.

6. The bit error information transfer method of claim 5, wherein receiving, by the first network device, the ISIS packet from the second network device and that comprises bit error information comprises receiving, by the first network device, an ISIS hello packet from the second network device and that comprises the bit error information, wherein the bit error information is carried in a type-length-value (TLV) field of the ISIS hello packet, wherein the bit error information comprises a bit error level used to indicate a bit error severity level and a bit error flag used to indicate a bit error type, and wherein performing traffic adjustment according to the bit error information comprises:
    increasing, according to the bit error flag, the cost value of the first unidirectional link or disconnecting the first unidirectional link; and
    determining, according to the bit error level, an extent to which the cost value of the first unidirectional link is to be increased when determining to increase the cost value of the first unidirectional link.

7. The bit error information transfer method of claim 5, wherein receiving, by the first network device, the ISIS packet from the second network device and that comprises the bit error information comprises receiving, by the first network device, an ISIS link state packet (LSP) packet from the second network device, and that comprises the bit error information, wherein the ISIS LSP packet comprises a first type-length-value (TLV) field and a second TLV field, wherein the bit error information comprises a bit error level carried in the first TLV field and indicating a bit error severity level, a bit error flag carried in the first TLV field and indicating a bit error type, and a link identifier carried in the second TLV field and indicating the link on which a bit error occurs, and wherein performing traffic adjustment according to the bit error information comprises:
    determining, according to the bit error flag, to increase the cost value of the first unidirectional link or disconnect the first unidirectional link; and
    determining, according to the bit error level, an extent to which the cost value of the first unidirectional link is to be increased When determining to increase the cost value of the first unidirectional link.

8. The bit error information transfer method of claim 4, wherein receiving, by the first network device, the ISIS packet from the second network device and that comprises bit error information comprises receiving, by the first network device, an ISIS hello packet from the second network device and that comprises the bit error information, and an ISIS link state packet (LSP) packet from the second network device and that comprises the bit error information, and wherein performing traffic adjustment according to the bit error information comprises performing traffic adjustment according to the bit error information comprised in the ISIS LSP packet or according to the bit error information comprised in the ISIS hello packet.

9. The bit error information transfer method of claim 4, wherein performing traffic adjustment according to the bit error information comprises:
    increasing a cost value of the first unidirectional link such that the cost value of the first unidirectional link is at least greater than a cost value of a third unidirectional link, wherein the third unidirectional link is the another unidirectional link from the first network device to the second network device; and
    disconnecting the first unidirectional link.

10. The bit error information transfer method of claim 4, wherein performing traffic adjustment according to the bit error information comprises increasing a cost value of the first unidirectional link such that the cost value of the first unidirectional link is at least greater than a cost value of a third unidirectional link, wherein the third unidirectional link is the another unidirectional link from the first network device to the second network device.

11. The hit error information transfer method of claim 4, wherein performing traffic adjustment according to the bit error information comprises disconnecting the first unidirectional link.

12. A network device, comprising:
    a bit error detector configured to detect whether a bit error occurs on a first unidirectional link from another network device to the network device;
    a packet generator configured to generate an Intermediate System to Intermediate System (ISIS) packet comprising bit error information when detecting that a bit error occurs on the first unidirectional link, wherein the bit error information indicates that the bit error occurs on the first unidirectional link; and
    a transmitter configured to send the ISIS packet to the another network device.

13. The network device of claim 12, wherein the packet generator is further configured to generate an ISIS hello packet comprising the bit error information, wherein the bit error information is carried in a type-length-value (TLV) field of the ISIS hello packet, wherein the bit error information comprises a bit error level used to indicate a bit error severity level and a bit error flag used to indicate a bit error type, wherein the transmitter is configured to send the ISIS hello packet to the another network device using a second unidirectional link from the network device to the another network device, and wherein the first unidirectional link and the second unidirectional link belong to a same physical link.

14. The network device of claim 12, wherein the packet generator is further configured to generate an ISIS link state packet (LSP) packet comprising the bit error information, wherein the ISIS LSP packet comprises a first type-length-value (TLV) field and a second TLV field, wherein the bit error information comprises a bit error level carried in the first TLV field and indicating a bit error severity level, a bit error flag carried in the first TLV field and indicating a bit error type, and a link identifier carried in the second TLV field and indicating the link on which a bit error occurs, and wherein the transmitter is further configured to:
    send the ISIS LSP packet to all neighboring devices; and
    transfer the ISIS LSP packet to the another network device using all neighboring devices.

15. A network device, comprising:
    a receiver configured to receive an Intermediate System to Intermediate System (ISIS) packet from another network device and that comprises bit error information, wherein the bit error information indicates that a bit error occurs on a first unidirectional link from the network device to the another network device; and
    a processor coupled to the receiver and configured to perform traffic adjustment according to the bit error information such that the network device subsequently sends data to the another network device using another link other than the first unidirectional link.

16. The network device of claim 15, wherein the processor is further configured to perform at least one of:
    increasing a cost value of the first unidirectional link such that the cost value of the first unidirectional link is at least greater than a cost value of a third unidirectional wherein the third unidirectional link is the another link from the network device to the another network device; or
    disconnecting the first unidirectional link.

17. The network device of claim 16, wherein the receiver is further configured to receive an ISIS hello packet from the another network device and that comprises the bit error information, wherein the bit error information is carried in a type-length-value (TLV) field of the ISIS hello packet, and wherein the bit error information comprises a bit error level used to indicate a bit error severity level and a bit error flag used to indicate a bit error type, and wherein the processor is further configured to:
   increase, according to the bit error flag, the cost value of the first unidirectional link or disconnect the first unidirectional link; and
   determine, according to the bit error level, an extent to which the cost value of the first unidirectional link is to be increased when determining to increase the cost value of the first unidirectional link.

18. The network device of claim 16, wherein the receiver is further configured to receive an ISIS link state packet (LSP) packet from the another network device and that comprises the bit error information, wherein the ISIS LSP packet comprises a first type-length-value (TLV) field and a second TLV field, wherein the bit error information comprises a bit error level carried in the first TLV field and indicating a bit error severity level, a bit error flag carried in the first TIN field and indicating a bit error type, and a link identifier carried in the second TLV field and indicating the link on which a bit error occurs, and wherein the processor is further configured to:
   determine, according to the bit error flag, to increase the cost value of the first unidirectional link or disconnect the first unidirectional link; and
   determine, according to the bit error level, an extent to which the cost value of the first unidirectional link is to be increased when determining to increase the cost value of the first unidirectional link.

19. The network device of claim 15, wherein the receiver is further configured to:
   receive an ISIS hello packet from the another network device and that comprises the bit error information; and
   receive an ISIS link state packet (LSP) packet from the another network device and that comprises the bit error information, and
   wherein the processor is further configured to perform traffic adjustment according to the bit error information comprised in the ISIS LSP packet or according to the bit error information comprised in the ISIS hello packet.

20. A communications system, comprising:
   a first network device, comprising:
      a receiver configured to receive an Intermediate System to Intermediate System (ISIS) packet from another network device and that comprises bit error information, wherein the bit error information indicates that a bit error occurs on a first unidirectional link from the first network device to the another network device; and
      a processor coupled to the receiver and configured to perform traffic adjustment according to the bit error information such that the first network device subsequently sends data to the another network device using another link other than the first unidirectional link: and
   a second network device comprising:
      a bit error detector configured to detect whether a bit error occurs on a first unidirectional link from another network device to the first network device;
      a packet generator configured to generate an Intermediate System to Intermediate System (ISIS) packet comprising bit error information when detecting that a bit error occurs on the first unidirectional link, wherein the hit error information indicates that the bit error occurs on the first unidirectional link; and
      a transmitter configured to send the ISIS packet to the another network device.

* * * * *

UNITED STATES PATENT AND TRADEMARK OFFICE
CERTIFICATE OF CORRECTION

| | |
|---|---|
| PATENT NO. | : 10,567,272 B2 |
| APPLICATION NO. | : 15/635649 |
| DATED | : February 18, 2020 |
| INVENTOR(S) | : Ruqin Lan et al. |

Page 1 of 1

It is certified that error appears in the above-identified patent and that said Letters Patent is hereby corrected as shown below:

In the Claims

Claim 4, Column 24, Line 45: "the hit error" should read "the bit error"

Claim 7, Column 25, Line 32: "increased When determining" should read "increased when determining"

Claim 11, Column 26, Line 1: "The hit error" should read "The bit error"

Claim 18, Column 27, Line 22: "the first TIN" should read "the first TLV"

Claim 20, Column 28, Line 32: "the hit error" should read "the bit error"

Signed and Sealed this
Twelfth Day of May, 2020

Andrei Iancu
*Director of the United States Patent and Trademark Office*